United States Patent
Griffin et al.

(10) Patent No.: US 11,788,241 B2
(45) Date of Patent: Oct. 17, 2023

(54) ROAD BASED ELECTRICAL STORAGE BATTERIES

(71) Applicant: Hunt Energy Enterprises, L.L.C., Dallas, TX (US)

(72) Inventors: Mark Griffin, Dallas, TX (US); Fantai Kong, McKinney, TX (US)

(73) Assignee: Hunt Energy Enterprises, L.L.C., Dallas, TX (US)

( * ) Notice: Subject to any disclaimer, the term of this patent is extended or adjusted under 35 U.S.C. 154(b) by 291 days.

(21) Appl. No.: 16/425,440

(22) Filed: May 29, 2019

(65) Prior Publication Data

US 2019/0368141 A1 Dec. 5, 2019

Related U.S. Application Data

(60) Provisional application No. 62/677,283, filed on May 29, 2018.

(51) Int. Cl.
*H01M 10/0585* (2010.01)
*E01F 11/00* (2006.01)
(Continued)

(52) U.S. Cl.
CPC ............... *E01F 11/00* (2013.01); *E01C 9/00* (2013.01); *E01C 11/00* (2013.01); *H01G 4/008* (2013.01);
(Continued)

(58) Field of Classification Search
CPC . E01F 11/00; H01M 50/124; H01M 10/0585; H01M 4/78; H01M 8/188; H01M 2250/10; H01M 2220/10; H01M 10/0525; H01G 4/008; H01G 11/30; E01C 9/00; E01C 11/00; Y02T 10/70; Y02E 60/10; Y02E 60/50; Y02B 90/10
See application file for complete search history.

(56) References Cited

U.S. PATENT DOCUMENTS 3,666,560 A * 5/1972 Cairns ................. H01M 10/399
429/103
2016/0027642 A1 1/2016 Antonov et al.
(Continued)

FOREIGN PATENT DOCUMENTS

JP 2016197586 A 11/2016
WO 2017160961 A1 9/2017

OTHER PUBLICATIONS

Transmittal and International Preliminary Report on Patentability issued in PCT/US2019/034396 dated Dec. 10, 2020, 9 pages.
(Continued)

*Primary Examiner* — Cynthia K Walls
(74) *Attorney, Agent, or Firm* — Baker Botts L.L.P.

(57) ABSTRACT

A road embedded battery includes a first encapsulation layer disposed on top of a road grade base. A first conductor mesh is disposed on top of the first encapsulation layer and an anode material is embedded into to first conductor mesh. A permeable membrane is disposed on top of the anode material. A second conductor mesh is disposed on top of the permeable membrane and a cathode material is embedded into the second conductor mesh. A second encapsulation layer is disposed on top of the cathode material.

6 Claims, 9 Drawing Sheets

(51) Int. Cl.
    *H01M 4/78*         (2006.01)
    *H01M 8/18*         (2006.01)
    *H01G 4/008*        (2006.01)
    *E01C 9/00*         (2006.01)
    *E01C 11/00*        (2006.01)
    *H01M 50/124*      (2021.01)

(52) U.S. Cl.
    CPC .............. *H01M 4/78* (2013.01); *H01M 8/188* (2013.01); *H01M 10/0585* (2013.01); *H01M 50/124* (2021.01); *H01M 2220/10* (2013.01); *H01M 2250/10* (2013.01)

(56) References Cited

U.S. PATENT DOCUMENTS

| | | | |
|---|---|---|---|
| 2016/0108591 A1* | 4/2016 | Heerkens | E01C 17/00 362/84 |
| 2016/0240326 A1 | 8/2016 | Fischel | |
| 2017/0054177 A1* | 2/2017 | Hung | H01M 4/5825 |
| 2017/0207489 A1 | 7/2017 | Zhamu et al. | |
| 2018/0138710 A1* | 5/2018 | Kocarev | H02J 3/14 |

OTHER PUBLICATIONS

International Search Report and Written Opinion issued in PCT/US2019/034396 dated Sep. 19, 2019, 12 pages.

\* cited by examiner

ROAD BASED ELECTRICAL STORAGE BATTERIES

CROSS-REFERENCE TO RELATED APPLICATION

The present application claims priority to U.S. Provisional Application Ser. No. 62/677,283 filed on May 29, 2018.

TECHNICAL FIELD

This invention relates to energy storage devices, aqueous electrochemical cells and batteries, flow batteries and electrical storage in general.

BACKGROUND

Renewable energy sources such as wind and solar are becoming much more prevalent in the supply of electrical power to transmission grids. Their variable nature has created electrical transmission grid management problems and crippling downward pricing pressure on renewable power generators. Large scale storage is a potential solution to these problems, but the scale and attendant costs are enormous. As an example, in a single hour, one wind turbine can fully charge ten of the largest capacity electric automobile battery piles available today. These piles represent over ten tons of highly engineered and expensive materials for merely one hour of electric service.

There are many proposed options for grid scale energy storage; however, intensive cost for materials and engineering have so far prevented widespread application of many of these proposed storage solutions.

Figure 1:
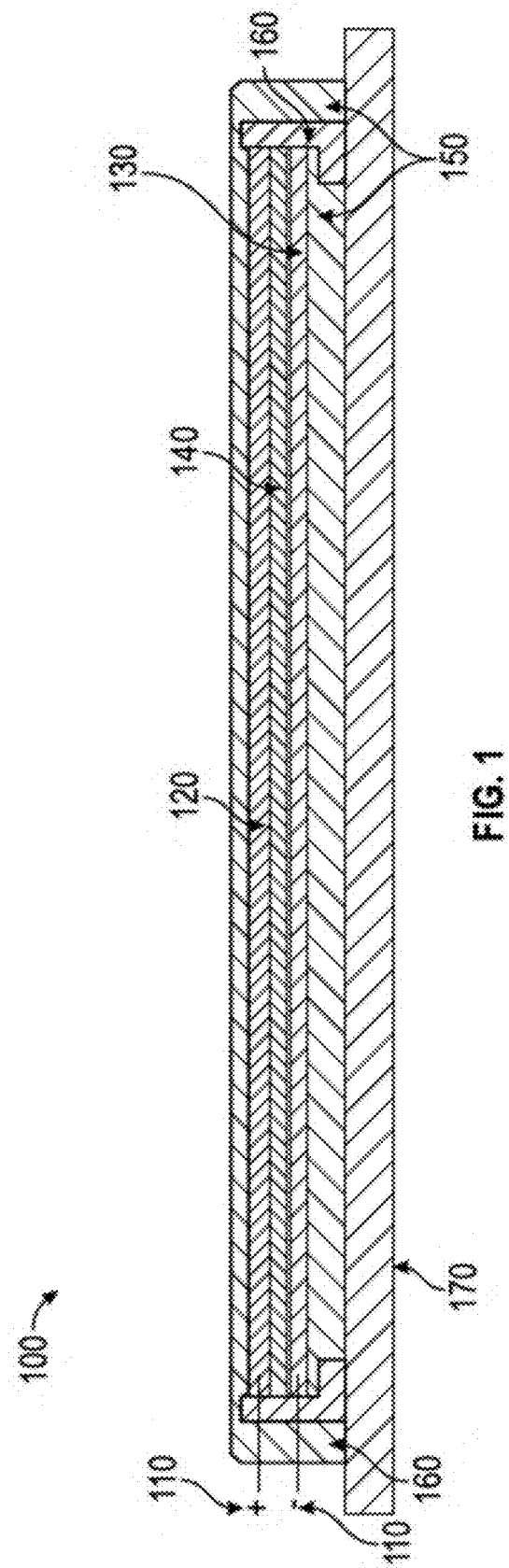
FIG. 1 is an illustration of a cross section of a single cell road embedded battery.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The large-scale embodiment of electrochemically active materials in roads may function as very large plates separated by load bearing porous, permeable media. The media may contain appropriate electrolyte materials to support ion transfer between the embedded battery plates. While in theory any electrochemically active sets of materials may be used in the construction of such batteries, less expensive and more environmentally benign cathode, anode, and electrolyte materials may be selected. High energy density may not be as important as cost.

As the battery is at surface, it may be important to encapsulate the battery both to prevent loss of materials and to mitigate environmental concerns. Cathode and anode materials may be filled in and around a mesh of conductors (wire or rods) that may be designed to improve the weight bearing capacity of the road. The permeable membrane, depending on choice of material, may also be reinforced for structural purposes. The dimensions of the battery are variable, depending upon load bearing requirements, environment, and the number of stacked cells in each battery section. Generally, battery sections may be on the order of 20 feet by 20 feet by 2 feet deep, but other sizes may also be used.

Energy production facilities, whether renewable or traditional, may have associated surface right of way in the form of roadways, as well as connections to the electrical grid. Road embedded batteries may be built on the existing road beds used for access to renewable power generating facilities. However, it is not required that road embedded batteries be directly connected to any particular generating facility. In an urban setting they could exist as parking lots for example, charged by power taken from the local grid at low use times, and the power reinjected into the grid as loads peaked during the day.

Bypassing the capital cost of expensive factories and making use of civil engineering methods and road building machinery which have already been developed for the highway construction industry, as well as selection of more cost effective electrochemically active materials fit for batteries that do not require high energy density and low weight, all hold real promise for much lower cost for grid scale electrical storage. Renewable wind and solar energy devices cannot on their own provide dependable day in and day out service without practical and cost-effective companion electrical storage.

Road embedded electrical storage systems may also help enable electric powered vehicle adoption. The system of electrodes disclosed herein may serve to connect vehicles to the power available from the connected grid as well as the charge stored in the battery system itself. This would help free electric vehicles from the need to carry heavy battery piles on board, improving both their efficiency and range.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $H_2SO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Na_2SO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $CH_3COONa$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $NaNO_3$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $ZnCl_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $ZnSO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Zn(CH_3COO)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Zn(NO_3)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $NiCl_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $NiSO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Ni(CH_3COO)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Ni(NO_3)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $MnCl_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $MnSO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Mn(CH_3COO)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Mn(NO_3)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Li_2SO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, V2O5, Fe2O3, MoO3, NaV3O8, TiO2, TiS2), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, V2O5, Fe2O3, MoO3, NaV3O8, TiO2, TiS2), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal or sodiated metal oxides/sulfides (for example, V2O5, Fe2O3, MoO3, NaV3O8, TiO2, TiS2), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Ni(CH3 COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Mn-based oxides/phosphates/silicates, the cathode material includes metal phosphates (for example, FePO4, MnPO4, NaTi2(PO4)3), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes Ni(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, V2O5, Fe2O3, MoO3, NaV3O8, TiO2, TiS2), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $MnCl_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $MnSO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Mn(CH_3COO)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Mn(NO_3)_2$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $Li_2SO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $LiCl$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $LiNO_3$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal or sodiated metal oxides/sulfides (for example, $V_2O_5$, $Fe_2O_3$, $MoO_3$, $NaV_3O_8$, $TiO_2$, $TiS_2$), and the electrolyte includes $CH_3COOLi$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, $FePO_4$, $MnPO_4$, $NaTi_2(PO_4)_3$), and the electrolyte includes $NaCl$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, $FePO_4$, $MnPO_4$, $NaTi_2(PO_4)_3$), and the electrolyte includes $H_2SO_4$.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Ni(CH3 COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes V-based phosphates/silicates, the cathode material includes metal phosphates (for example, FePO4, MnPO4, NaTi2(PO4)3), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Ni(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal or sodiated metal oxides/sulfides (for example, V2O5, Fe2O3, MoO3, NaV3O8, TiO2, TiS2), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Ni(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Metal hexacyanoferrates (for example, CuHCF, NiHCF, MnHCF, etc.), the cathode material includes metal phosphates (for example, FePO4, MnPO4, NaTi2(PO4)3), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Ni(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal or sodiated metal oxides/sulfides (for example, V2O5, Fe2O3, MoO3, NaV3O8, TiO2, TiS2), and the electrolyte includes CH3COOLi.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes NaCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes H2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes NaOH.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes Na2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes CH3COONa.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes NaNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes ZnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes ZnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2(PO4)3), and the electrolyte includes Zn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Zn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes NiCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes NiSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Ni(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Ni(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes MnCl2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes MnSO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Mn(CH3COO)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Mn(NO3)2.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes Li2SO4.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes LiCl.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes LiNO3.

One example road embedded batter includes a plurality of cathodes, wherein the cathodes are formed from vertically-oriented metal current collectors coated with one or more active cathode materials, a plurality of anodes, wherein the anodes are formed from vertically-oriented metal current collectors coated with one or more active anode materials, an electrolyte between the plurality of cathodes and plurality of anodes; and wherein the plurality of cathodes, the plurality of anodes, and electrolytes are disposed, at least partially, under a roadway, wherein the anode material includes Activated carbon, the cathode material includes metal phosphates (for example, FePO4, MnPO4, NaTi2 (PO4)3), and the electrolyte includes CH3COOLi.

DETAILED DESCRIPTION

FIG. 1 is an illustration of a cross section of a single cell road embedded battery 100. Single cell road embedded battery 100 may be constructed upon grade base 170 and have electrodes 110, cathode material 120, anode material 130, permeable membrane 140, and may be bounded by encapsulation 150 and curbs 160.

Figure 10:
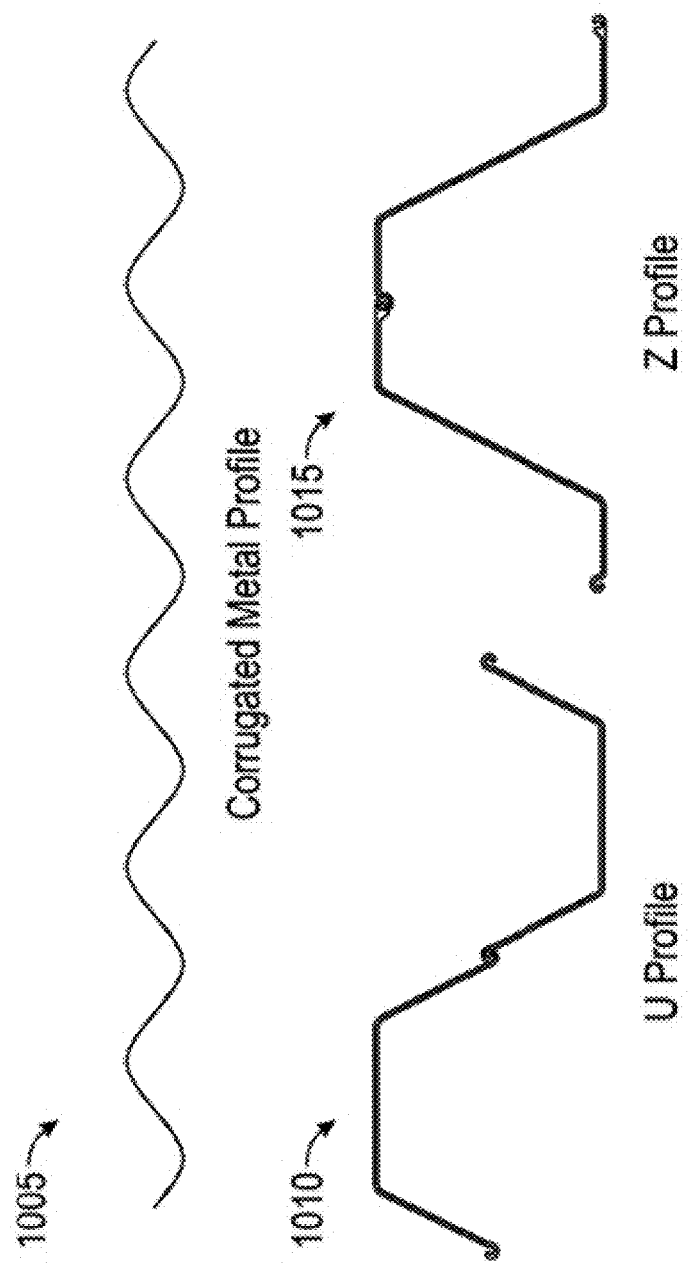
FIG. 10 is an illustration of three example profiles of corrugated iron and sheet pile for road-embedded batteries or capacitors.

Cathode material 120 and anode material 130 may be coupled to electrodes 110 and separated by permeable membrane 140. Cathode material 120 and anode material 130 may be filled in and around a mesh of conductors, such as wires or rods acting as current collectors. The conductor mesh may be electrically coupled to electrodes 110. For example, the conductor mesh around which cathode material 120 is deposited may be coupled to a positive electrode 110, and the conductor mesh around which anode material 130 is deposited may be coupled to a negative electrode 110. The conductor mesh may be engineered to provide structural support to the road surface. In some configurations of the road-embedded battery, formed metal sheets, for example corrugated iron, steel and aluminum as well as steel and coated steel sheet piling or pierced steel planking may be used both as current collector, and as a means for increasing the load bearing characteristics of the road. Common profiles for formed metal sheets are shown in FIG. 10. Any of these metal forms may be used in the construction of a road embedded battery. In certain embodiments, Z profile sheet pile may have the best mechanical characteristics, but the cost of materials may be an overriding concern in grid scale batteries, and the form of the current collector must be considered in the context of expected vehicle loads and the battery cycle life. Road maintenance intervals and battery maintenance and degradation must be considered in the overall levelized cost of service for the road embedded battery.

Any electrochemically active sets of materials may be used as anode material 130 and cathode material 120. Examples of cathode material 120 include, but are not limited to, one or more of lead, zinc, iron, nickel, carbon, lithium. Example of anode material 130 include one or more of lithium iron phosphate, sodium iron phosphate, lithium-metal oxides such as lithium cobalt oxide and lithium copper oxide, nickel metal hydride and other materials used in battery manufacture. Suitable electrolytes may be various acids, bases and salts that are known to support the ion and electron transfer required for charge and discharge of batteries. These may be contained in aqueous solution, organic complexes and supported in gels, mats, cloth other suspensions. In some embodiments, less expensive and more environmentally inactive materials may be used for cathode material 120, anode material 120, and permeable membrane 140. Given the potential size of road embedded battery 100, high energy density may not be as important as cost.

Anode material 130 and cathode material 120 may be separated by a permeable membrane 140. Permeable membrane 140 may be porous and function as an ion exchange membrane facilitating separation and transfer of charge between anode material 130 and cathode material 120. While permeable membrane 140 may be formed of any material common in the construction of current battery types, use of packed sand and or pervious concrete may be chosen in the construction of road embedded battery 100 for reasons of economy and strength. In certain example embodiments, permeable membrane 140 is filled with an electrolyte to facilitate charge movement between cathode material 120 and anode material 130. Permeable membrane 140 may be structurally reinforced to provide support for a road into which battery 100 is embedded.

Curbs 160 may serve as bounds on either side of the road to keep cathode material 120, anode material 130, and permeable membrane 140 contained within the road structure. Curbs 160 may be impermeable to prevent environmental liquids from entering the battery and degrading any of cathode material 120, anode material 130, and permeable membrane 140.

Encapsulation 150 may be a material that is sufficiently impermeable to prevent intrusion by water or other liquids into battery 100. Encapsulation 150 may also prevent loss of cathode material 120 and anode material 130 from the battery 100. For example, encapsulation 150 may include materials such as asphalt, concrete, polymers, and metals. In some embodiments, encapsulation 150 may fully surround cathode material 120, anode material 130, and permeable membrane 140. In other embodiment a layer of encapsulation 150 may be placed upon grade base 170 and a second layer of encapsulation 150 may be placed on top of battery 100 after cathode material 120, anode material 130, and permeable membrane 140 have been deposited. Encapsulation 150 may, in some embodiments, be the same material as curbs 160. In other embodiments, encapsulation 150 may be a different material than curbs 160. In some embodiments, a layer of asphalt or concrete may be placed on top of encapsulation 150 to provide a drivable road surface. Encapsulation 150 may, in other embodiments, provide a road surface.

In certain example embodiments, battery 100 may have the width of any road surface. In other embodiments, the battery 100 is partially disposed under a roadway or battery 100 is smaller than the footprint of the roadway. The dimensions of battery 100 may be variable, depending upon load bearing requirements, environment, and the number of stacked cells in each battery section. In one embodiment, battery sections may be on the order of 20 feet by 20 feet by 2 feet deep.

Energy production facilities, whether renewable or traditional, may have associated surface right of way in the form of roadways, as well as connections to the electrical grid. In some embodiments, road embedded batteries, such as battery 100, may be built on existing road beds used for access to renewable power generating facilities. For example, battery 100 may be constructed on the road beds used to access wind power facilities or solar power installations and provide storage capacity for excess electricity generated by wind turbines or solar power installations. However, it is not required that road embedded batteries be directly connected to any particular power generating facility. In an urban setting, battery 100 could built as parking lots for example, and may be charged by power taken from the local grid at low use times, and the power reinjected into the grid as loads peaked during the day.

One method for constructing road embedded battery 100 may include first grading a base layer to create grade base 170, and then depositing a layer of encapsulation 150 onto grade base 170. Next, a first conductor mesh may be deposited onto the layer of encapsulation 150. Next, an anode material 130 may be deposited or embedded into the first conductor mesh. Then, a permeable membrane 140 may be deposited onto the anode material 130. Next a second conductor mesh may be deposited onto permeable membrane 140. Next, cathode material 120 may be deposited or embedded into the second conductor mesh. Finally, a second layer of encapsulation 150 may be deposited onto the cathode material.

Figure 2:
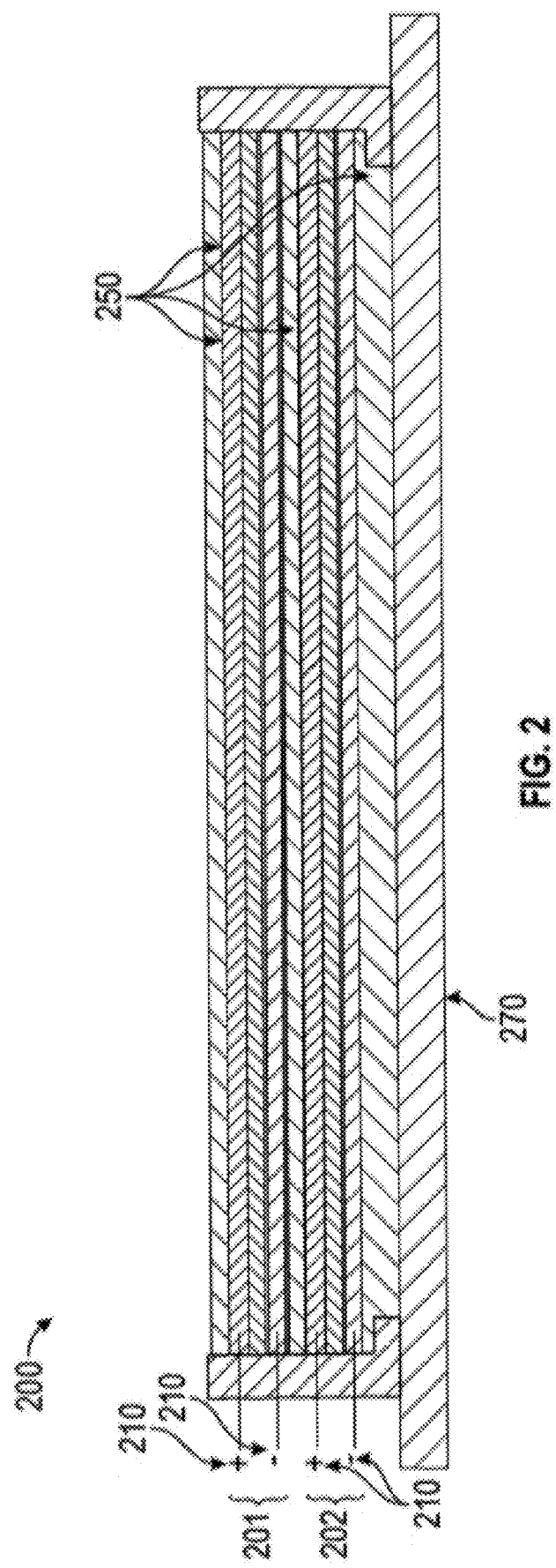
FIG. 2 is an illustration of a cross section of a multiple stacked cell road embedded battery.

FIG. 2 is an illustration of a cross section of a multiple stacked cell road embedded battery 200. In the illustrated embodiment, battery 200 has two battery cells, battery cell 201 and battery cell 202. However, in other embodiments, battery 200 may be formed of as many stacked battery cells as needed to provide the desired characteristics of battery 200. Battery cells 201 and 202 may have a structure similar to that described with respect to the single cell road embedded battery 100 of FIG. 1.

Battery cells 201 and 202 may be separated by encapsulation 250. Encapsulation 250 may comprise the same materials and serve the same purpose as described with respect to encapsulation 150 of FIG. 1. Encapsulation 250 may additionally provide electrical isolation between battery cell 201 and battery cell 201. Battery cell 201 may be connected to battery cell 202 by electrodes 210. In some embodiments battery cell 201 may be connected to battery cell 202 in a parallel configuration. In other embodiments, battery cell 201 may be connected to battery cell 202 in a series configuration.

Figure 3:
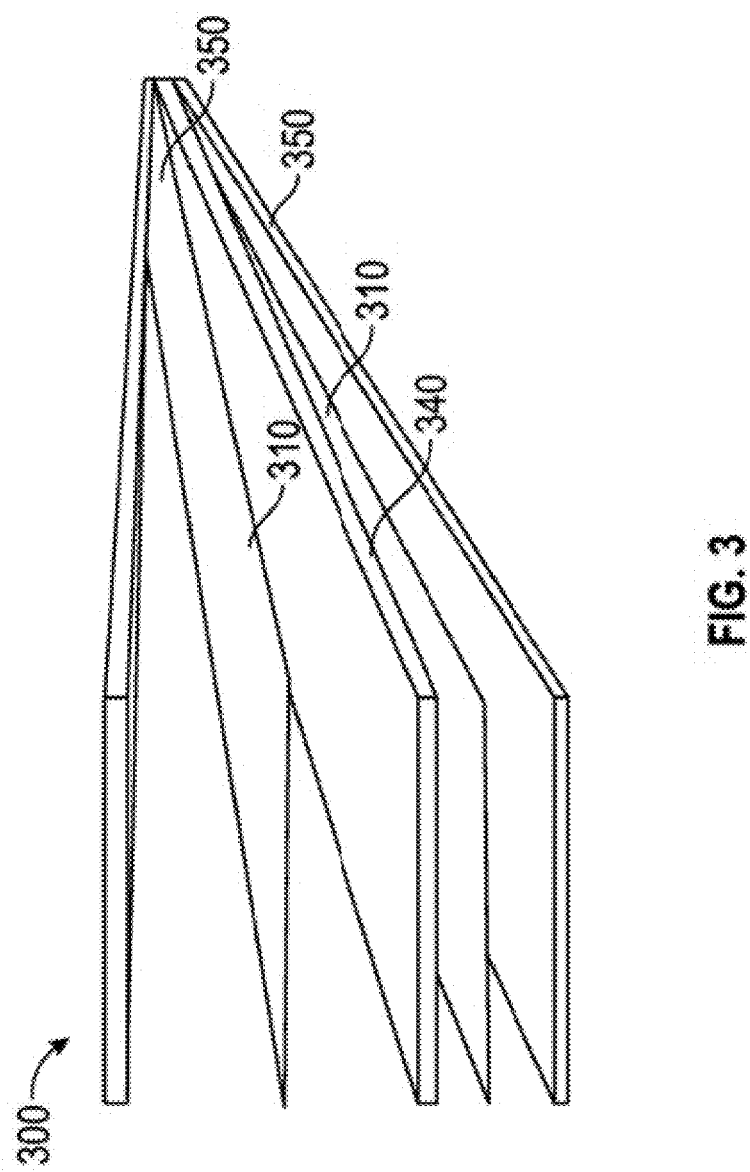
FIG. 3 is an illustration of an exploded view of components of a single cell road embedded battery.

FIG. 3 is an illustration of an exploded view of components of a single cell road embedded battery 300. Battery 300 may have a similar structure to battery 100 of FIG. 1. As described with respect to battery 100, conducting mesh electrodes 110 may be permeated with anodic or cathodic materials. For example, the top conducting mesh electrode 110 may be permeated with a cathodic material and the bottom conducting mesh electrode 110 may be permeated with an anodic material. In another embodiment, the bottom conducting mesh electrode 110 may be permeated with a cathodic material and the top conducting mesh electrode 110 may be permeated with an anodic material.

Membrane 340 may be a material as described with respect to membrane 140 of FIG. 1 and may be porous and facilitate charge transfer between cathodic and anodic materials embedded in conducting mesh electrodes 110.

In certain implementations, the road embedded batteries feature dual-ion battery technology. In general, the electrodes in road embedded batteries are separated by porous and permeable, structurally competent materials that contain the electrolyte which supports ion transfer between the electrodes. This permeable membrane, depending on choice of material, may also be reinforced for structural purposes, and may be a few feet thick, far wider than traditional storage battery electrode separation distances. Applying dual ion redox battery chemistry to shorten the ion diffusion lengths in road embedded batteries may improve charge/discharge rates and power density.

Figure 4:
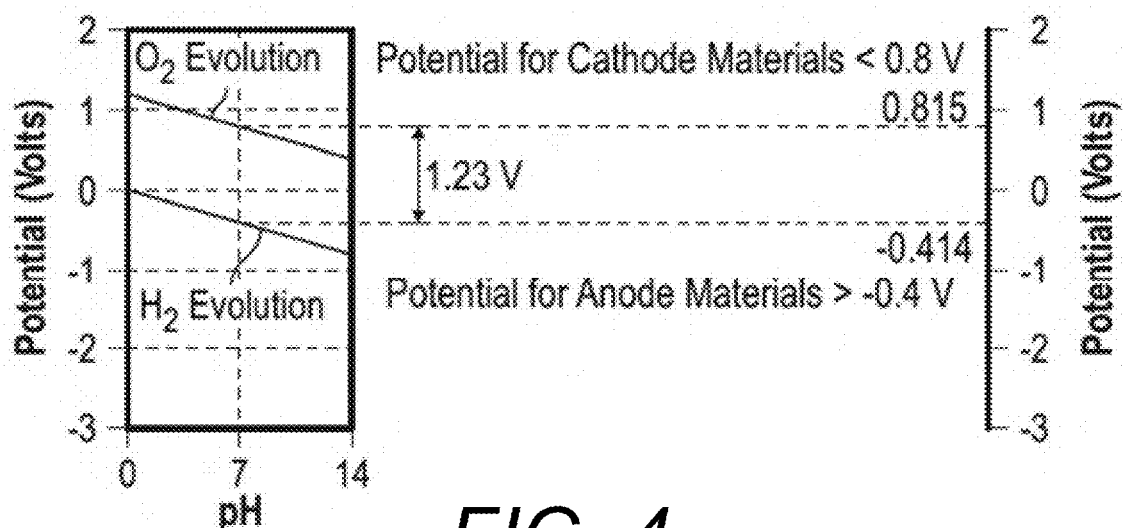
FIG. 4 is a diagram of the potential for water electrolysis in an aqueous battery and shows the stability window for aqueous battery design.

In one embodiment a road embedded battery is operated in an aqueous system in which inorganic salts (such as NaCl, $Na_2SO_4$, $ZnSO_4$, $Zn(NO_3)_2$, $NiSO_4$, $MnSO_4$, etc) in a substantially $H_2O$ solution is used as the electrolyte. As shown in FIG. 4, because water electrolysis that leads to $H_2$ and $O_2$ evolutions happens when applied potential is greater than 1.23 V, in certain example embodiments the intercalation or adsorption potentials for electrodes are designed to locate in a stability window of 1.23 V. Specifically for a NaCl electrolyte whose pH value is 7, the potential for cathode materials should be less than 0.8 V vs SHE, while that for anode materials should be larger than −0.4 V vs SHE. ("SHE" stands for "Standard Hydrogen Electrode")

Figure 5:
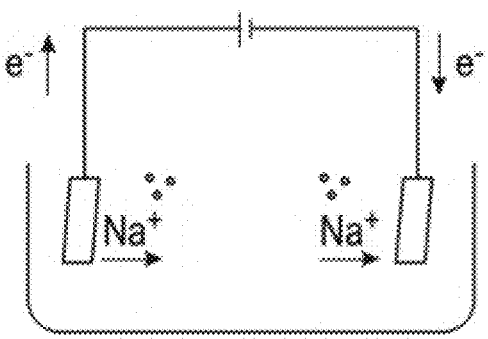
FIG. 5 is a diagram of a battery with NaCl electrolyte.

As shown in FIG. 5, in a "rocking chair" aqueous rechargeable battery design, the cathode provides a cation source which acts as charge carriers through reversible intercalations between cathode and anode. In the example of NaCl electrolyte, it serves as Na+ ion conducting, as well as an electron insulating medium. In certain example embodiments, the cathode should provide Na intercalation potential below 0.8 V vs SHE, and the anode potential is over −0.4 V vs SHE. Consequently, promising candidates for cathode are Mn-based oxides/phosphates/silicates, V-based phosphates/silicates, metal hexacyanoferrates (for example, CuHCF, NiHCF, MnHCF, etc.), activated carbon, etc., and candidates for the anode include metal or sodiated metal oxides/sulfides (for example, $V_2O_5$, $Fe_2O_3$, $MoO_3$, $NaV_3O_8$, $TiO_2$, $TiS_2$, etc.), metal phosphates (for example, $FePO_4$, $MnPO_4$, $NaTi_2(PO_4)_3$, etc.), activated carbon, etc. In the example of $ZnSO_4$ or $NiSO_4$ electrolyte, $ZnSO_4$ or $NiSO_4$ serves as $Zn^{2+}$ or $Ni^{2+}$ conducting medium. In certain example embodiments, the cathode materials are layered or porous oxides, such as manganese oxides, vanadium oxides, activated carbon. And the anode materials are Zn or Ni metal sheet or foam, activated carbon.

Figure 6:
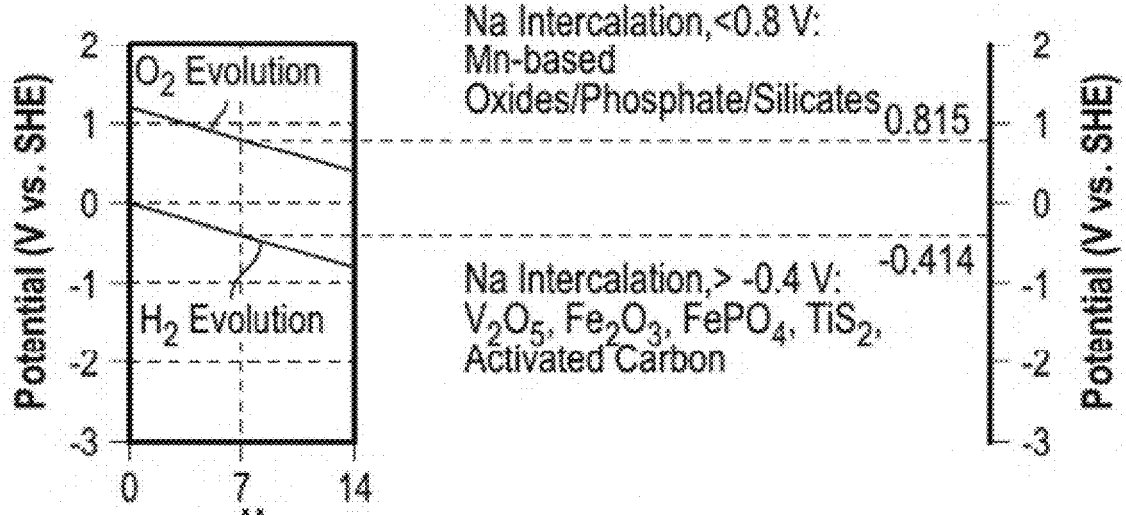
FIG. 6 illustrates the charging process and principles for aqueous NaCl solution based dual ion battery if there is no Na and Cl source in electrodes.

In dual ion road embedded batteries, both cation and anion in the electrolyte are charge carriers, and they are supplied by the electrolyte which now serves as an electrochemically active medium. The electrodes now act as acceptors of cation or anion that trigger the relative redox reaction. Electrodes can also be designed to contain cation and anion that function together with electrolyte as charge carrier suppliers. The example using Na and Cl as cation and anion is shown in FIG. 6.

Figure 7:
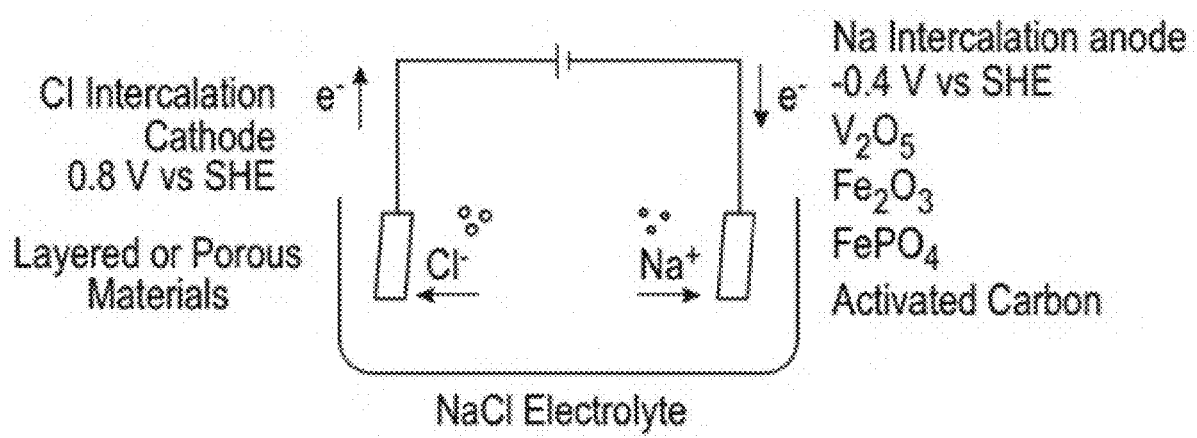
FIG. 7 is a diagram of a dual-ion battery where the electrode materials do not supply Na and Cl.

As shown in FIG. 7, in embodiments where there are no Na and Cl sources in the electrodes, the electrodes are carrier acceptors. In the dual ion system, Cl— donates an electron to an external circuit as cathode. The potential for Cl intercalation should be below 0.8 V vs SHE. The candidate materials may be graphite, oxides, nitrides, phosphates, carbides, etc., that have layered or porous structures with large space that permits reversible Cl diffusion. And Cl-based metal oxychloride (for example, BiOCl, FeOCl, MnOCl, etc.), layered or porous compounds such as Double-Layered Hydroxides, clay and activated carbon. The potential for Na intercalation should be higher than −0.4 V vs SHE. Candidates may be metal or sodiated metal oxides/sulfides (for example, $V_2O_5$, $Fe_2O_3$, $NaV_3O_8$, $TiO_2$, $TiS_2$, etc.), metal phosphates (for example, $FePO_4$, $MnPO_4$, $NaTi_2(PO_4)_3$, etc.), activated carbon, etc.

Figure 8:
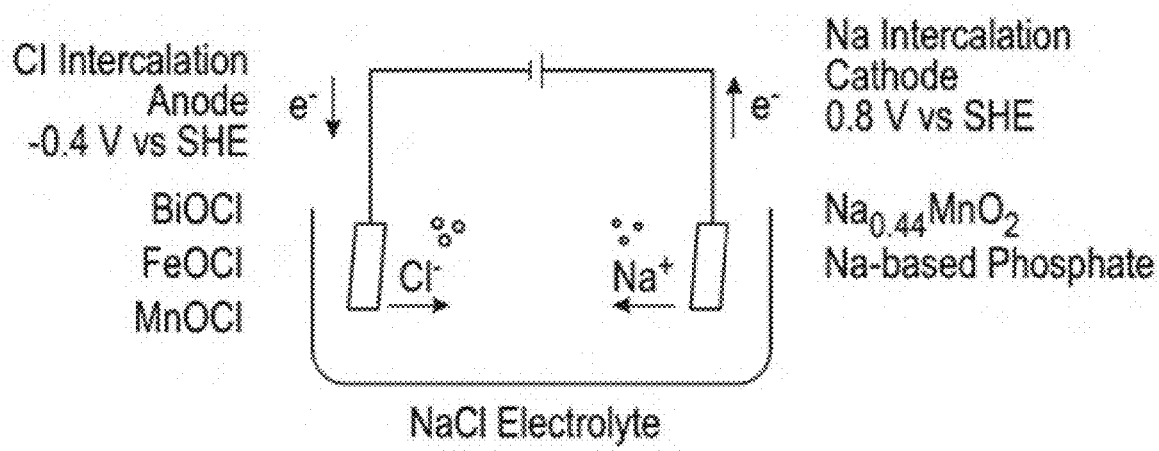
FIG. 8 is a diagram of a dual-ion battery where the electrode materials also supply Na and Cl sources.

As shown in FIG. 8, in embodiments where the electrode materials also supply Na and Cl sources, the design principle is reversed, so that when charging the battery, Cl will supply an electron and diffuse into the electrolyte, while at the same time Na donates an electron to an external circuit. In this case, Na-based compounds now work as cathode with potential lower than 0.8 V vs SHE. And the candidates may be Mn-based oxides/phosphates/silicates, V-based phosphates/silicates, metal hexacyanoferrates (for example, CuHCF, NiHCF, MnHCF, etc.), activated carbon, etc., graphite, oxides, nitrides, phosphates, carbides, etc., that have layered or porous structures with large space that permits reversible Cl diffusion. Cl-based metal oxychloride (for example, BiOCl, FeOCl, MnOCl, etc.), layered or porous compounds such as Double-Layered Hydroxides, clay and activated carbon are candidates for the anode with potential higher than −0.4 V vs SHE.

Figure 9:
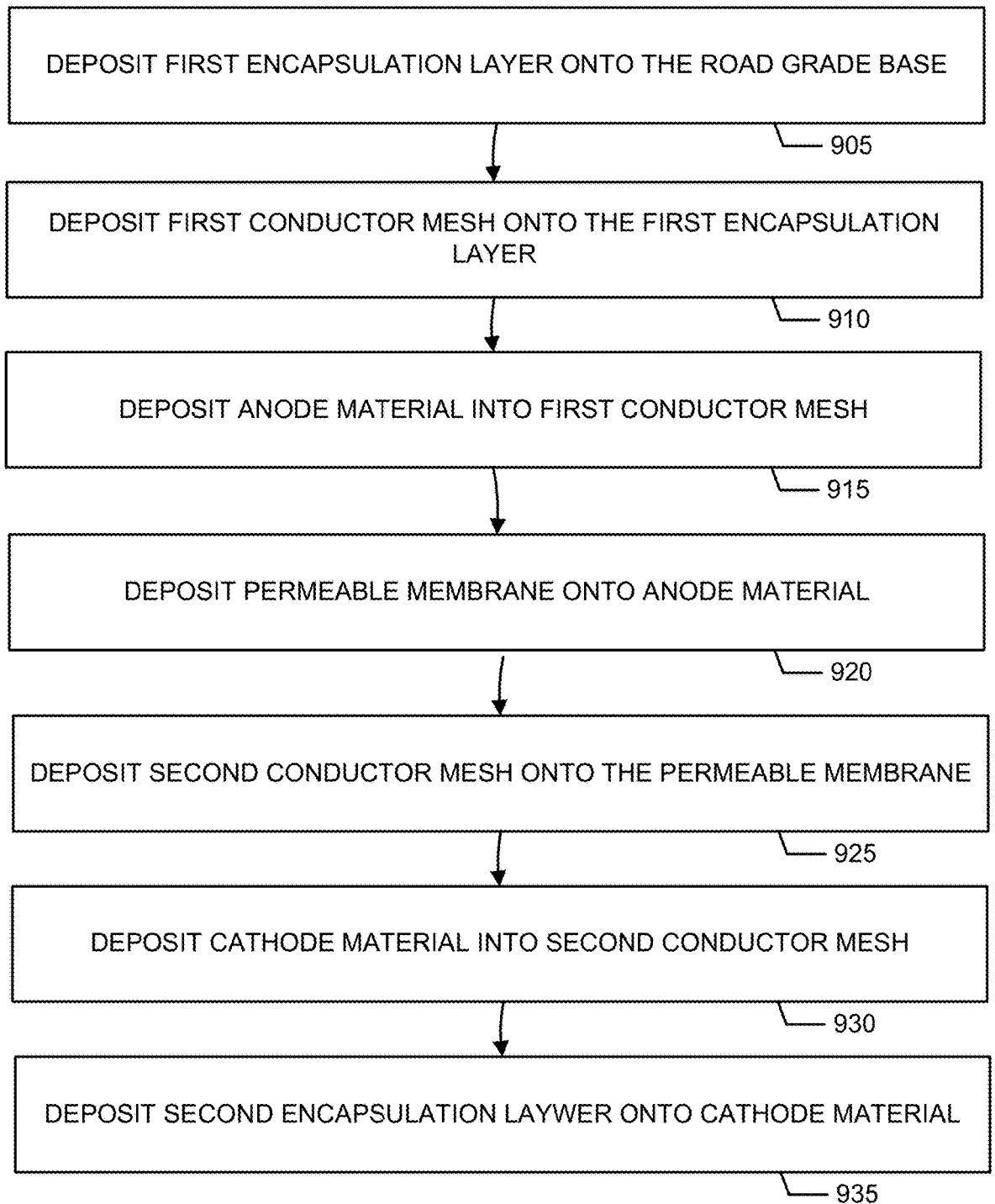
FIG. 9 is a flow chart of example method of forming a road-embedded battery.

An example method of constructing a road embedded battery is shown in FIG. 9. In block 905, a first encapsulation layer is deposited onto the road grade base. In block 910, a first conductor mesh is deposited on the first encapsulation layer. In block 915, an anode material is deposited into the first conductor mesh. In block 920, a permeable membrane is deposited onto the anode material. In block 925, a second conductor mesh is deposited onto the permeable membrane. In block 930, a cathode material is deposited into the second conductor mesh. In block 925, a second encapsulation layer is deposited onto the cathode material.

In certain embodiments, the dual ion battery design provides advantages over the traditional rocking chair design for road embedded batteries. First, because the electrolyte is an electrochemically active medium, Na+ and Cl− ions diffuse into neighboring electrodes simultaneously without the long travel of a single charge Na+ ion carrier. This can improve the rate performance of large scale road embedded batteries. Second, this system provides a pathway to way to using electrode materials that do not require a pre-sodiation treatment, resulting in reduced materials cost.

While the road embedded batteries of FIGS. 1-3 have a generally horizontal cell arrangement, other road embedded batteries may have a generally vertical cell arrangement. In certain example embodiments, a roadbed may be excavate to a depth. Example excavation depths include 1 foot, 2 feet, 3 feet, 4 feet, 5 feet, 6 feet, 7 feet, 8 feet, 9 feet, 10 feet, 11 feet, 12 feet or more, depending on the cost of excavation. In certain embodiments, a layer of encapsulation material is installed on the below grade road bed, then impermeable curbs are installed on the roadbed to the height of the excavation. In certain embodiments, metal current collectors appropriately coated with electrochemically active materials are inserted vertically or substantially vertically onto or into the encapsulation material.

Metal current collectors for use in one or more of the following embodiments may be cut from corrugated metal or sheet pile which may have one of a number of profiles as shown in FIG. 10. In certain embodiments, the metal current collectors may have a standard corrugated metal profile 1005. In other example embodiments, based on the need of the roadbed, metal or sheet pile may have U-profile 1010 or Z-profile 1015. As discussed above, different profiles may be used based on one or more design choices or constrains of the road-embedded battery.

Figure 11:
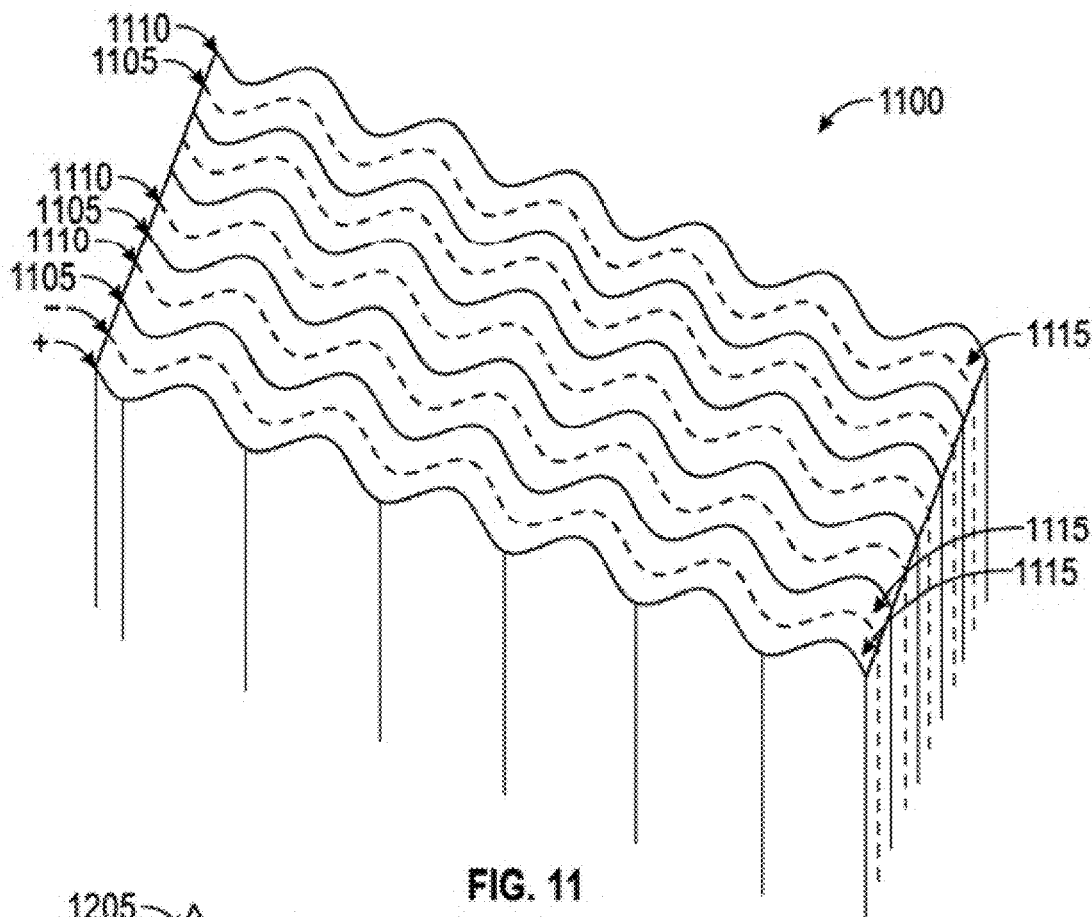
FIG. 11 is an illustration of an example road-embedded flow battery.

An example vertically-oriented road embedded battery 1100 is shown in FIG. 11. A series of cathodes 1105 and anodes 1110 are separated by electrolytes 1115. Cathodes 1105 and anodes 1110 may be formed by coating metal current collectors with electrochemically active materials to form cathode and anode pairs. As an example, lead oxide coating on one current collector and lead on another current collector with an aqueous sulfuric acid electrolyte would be the lead acid road embedded battery. In certain example embodiments the cathodes 1105 and the anodes 1110 both include stainless steel coated with active cathode or anode materials, polymer binder, and carbon black. In certain example embodiments cathode materials include Mn-based oxides/phosphates/silicates, V-based phosphates/silicates, metal hexacyanoferrates (for example, CuHCF, NiHCF, MnHCF, etc.), activated carbon, etc., and candidates for the anode include metal or sodiated metal oxides/sulfides (for example, V2O5, Fe2O3, MoO3, NaV3O8, TiO2, TiS2, etc.), metal phosphates (for example, FePO4, MnPO4, NaTi2(PO4)3, etc.). In other example embodiments, the cathode 1105 is composed of carbon felt or cloth and the anode 1110 is Zn coated metal sheet, Ni metal sheet or galvanized stainless steel. In general, any electrochemically active sets of materials may be used as anode 1105 and cathode 1110. Examples of anode 1105 materials include, but are not limited to, lead, zinc, iron, nickel, carbon, and lithium among others, either as elemental metals or compounded with other elements. Examples of cathode 1110 materials include, but are not limited to, one or more of lithium iron phosphate, sodium iron phosphate, lithium-metal oxides such as lithium cobalt oxide and lithium copper oxide, nickel metal hydride, lead oxide and other materials for cathodes, all of which may be used in battery manufacture. Suitable electrolytes 1115 may be various acids, bases, and salts that are known to support the ion and electron transfer required for charge and discharge of batteries. Example electrolytes 1115 include aqueous solutions of NaCl, H2SO4, NaOH, Na2SO4, CH3COONa, NaNO3, ZnCl2, ZnSO4, Zn(CH3COO)2, Zn(NO3)2, NiCl2, NiSO4, Ni(CH3COO)2, Ni(NO3)2, MnCl2, MnSO4, Mn(CH3COO)2, Mn(NO3)2, Li2SO4, LiCl, LiNO3, CH3COOLi etc.

Figure 12:
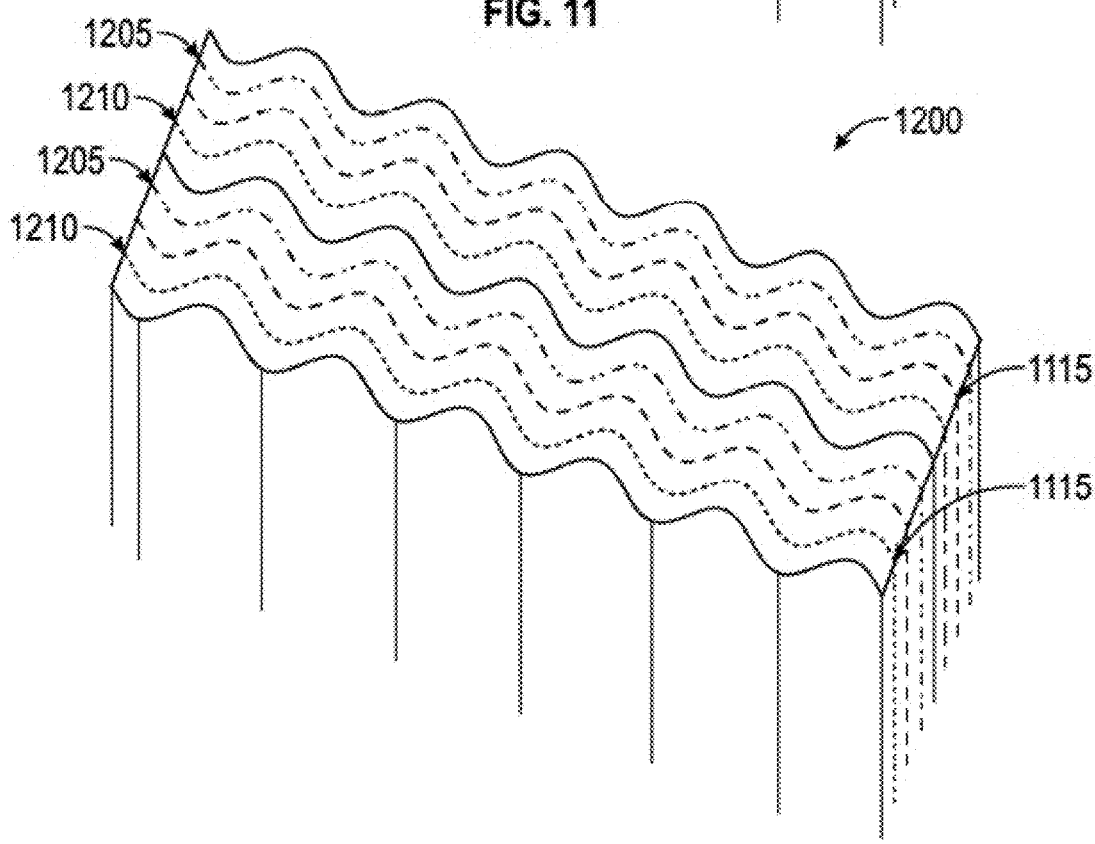
FIG. 12 is an illustration of an example road-embedded capacitor system.

FIG. 12 depicts an example road embedded flow battery 1200 that includes vertically oriented plates structured to provide flow channels. The road embedded flow battery 1200 includes catholyte flow channels 1205 and anolyte flow channels 1210 separated by separators 1215. The catholyte flow channels 1205 and anolyte flow channels 1210 may be disposed on corrugated metal or sheet pile. Example of catholyte includes solutions containing $Fe(CN)_6^{3-}$, I—, $Fe^{3+}$, $Vo^{2+}$, $Br_2$, $PbO_2$, $Mn^{3+}$, $Ce^{4+}$, and anolytes includes solutions containing $Zn^{2+}$, $S_4^{2+}$, $Fe^{2+}$, $Cr^{3+}$, $V^{3+}$, $Pb^{2+}$, $TiO^{2+}$, $Sn^{4+}$, $Cu^{2+}$. An example separator 1215 is composed of nanoporous membrane, such as poly(vinyl chloride) (PVC)/silica composite, cardo-poly-(ether-ketone)-based AEM and cation-exchange membrane (CEM) (Nafion 212), etc. One consideration of applying flow battery is that it potentially provides higher capacity and durability as energy storage system than comparable non-flow batteries.

Figure 13:
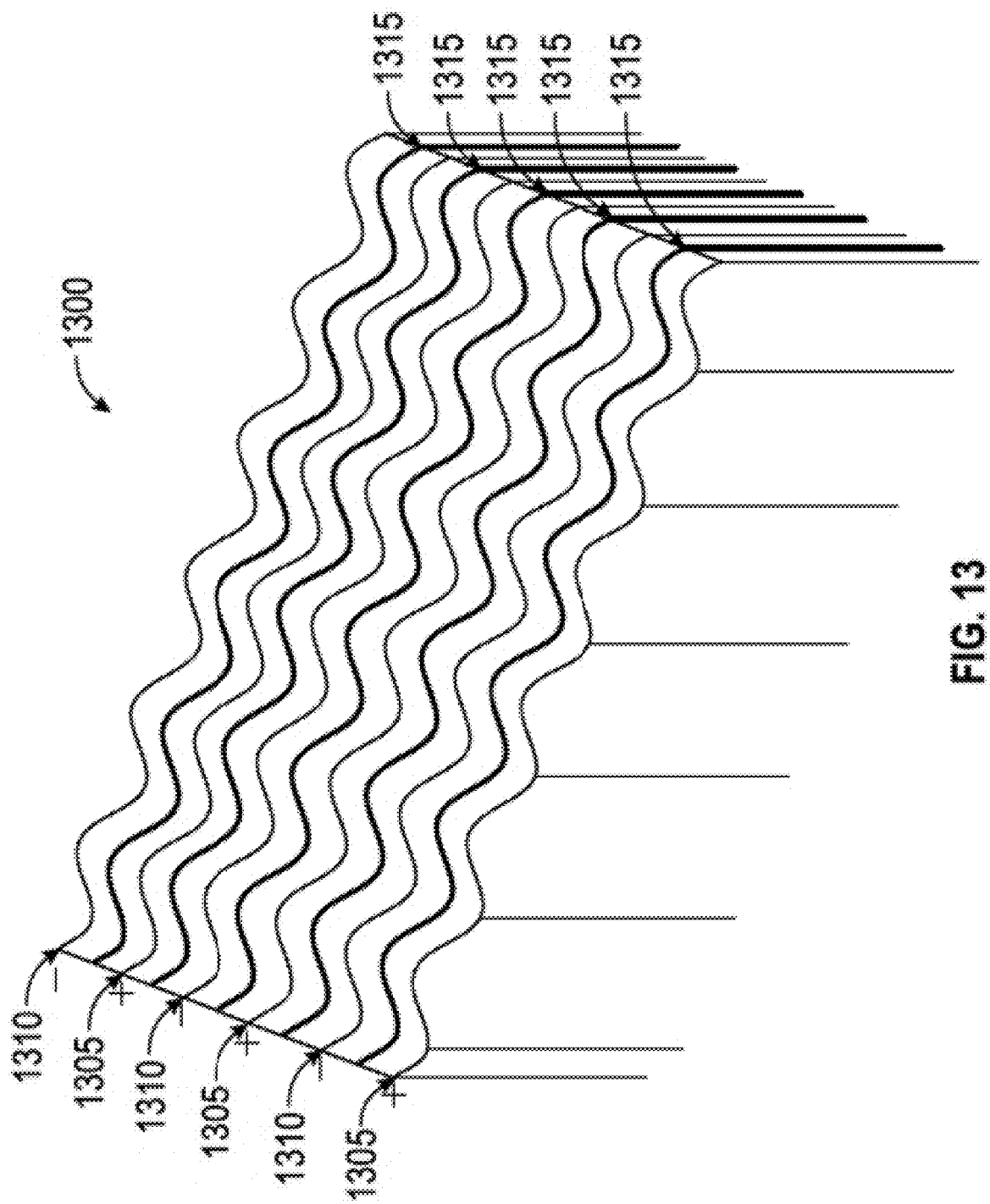

FIG. 13 depicts an example road embedded capacitor 1300. In certain example embodiments, a road-embedded capacitor may be preferable to a road-embedded battery where a greater number of charge/discharge cycles are needed. In general, a road embedded capacitor 1300 may have a higher durability and lower cost than a comparable battery. In the example road-embedded capacitor 1300, a series of metal plates 1305 and 1310 are arranged in a generally vertical orientation. As discussed above the metal plates 1305 and 1310 may be cut from corrugated metal or sheet pile. Dielectric layers 1315 separate the metal plates 1305 and 1310 to create a set of capacitors. The metal plates 1305 and 1310 are made to be electrodes by coating the metal plates 1305 and 1310 in electrode materials including activated carbon, graphene, carbon nanotube, oxides such as $RuO_2$, $MnO_2$, $Mn_3O_4$, $V_2O_5$, $VO_2$, $Fe_2O_3$, $Fe_3O_4$, NiO, $Co_3O_4$, sulfides such as $TiS_2$, $FeS_2$, $VS_2$, carbides such as SiC, $Ti_3C_4$, conductive polymers such as polyaniline, polythiophene, polypyrrole, polyacetylene, polyacene, and combinations of any of the preceding.

In certain embodiments, a road-based storage system may include one or more road embedded batteries, one or more road embedded flow batteries, and/or one or more road embedded capacitors.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A road embedded battery, comprising:
    a plurality of cathodes, wherein the cathodes are formed from vertically-oriented metal current collectors coated with one or more active cathode materials;
    a plurality of anodes, wherein the anodes are formed from vertically-oriented metal current collectors coated with one or more active anode materials;
    an electrolyte between the plurality of cathodes and plurality of anodes;
    wherein the plurality of cathodes, the plurality of anodes, and electrolytes are disposed, at least partially, under a roadway;
    wherein the road embedded battery is connected to the electrical grid and configured to be charged by power from the electrical grid and to reinject power to the electrical grid; and
    wherein the vertically-oriented oriented metal current collectors include sheet pile.

2. The road embedded battery of claim 1, wherein in the active cathode materials includes a lead oxide coating, the active anode material includes lead, and the electrolyte includes aqueous sulfuric acid.

3. The road embedded battery of claim 1, wherein in the active cathode materials includes carbon felt or cloth, the active anode material includes zinc.

4. The road embedded battery of claim 1, wherein the active cathode materials include one or more of materials selected from the group consisting of:
    Mn-based oxides, Mn-based phosphates, Mn-based silicates, V-based phosphates, V-based silicates, metal hexacyanoferrates, and activated carbon; and wherein the active anode materials include one or more of materials selected from the group consisting of:
    sodiated metal oxides, sodiated metal sulfides, and metal phosphates.

5. The road embedded battery of claim 1, wherein the electrolyte includes one or more aqueous solutions selected from the group consisting of: NaCl, Na2SO4, CH3COONa, NaNO3, ZnCl2, ZnSO4, Zn(CH3COO)2, Zn(NO3)2, NiCl2, NiSO4, Ni(CH3COO)2, Ni(NO3)2, MnCl2, MnSO4, Mn(CH3COO)2, and Mn(NO3)2.

6. The road embedded battery of claim 1, wherein the vertically-oriented metal current collectors include corrugated metal.

* * * * *